Sept. 27, 1960        O. C. WINZEN        2,954,187
BALLOON AND METHOD AND APPARATUS FOR LAUNCHING THE SAME
Filed Jan. 13, 1955                            6 Sheets-Sheet 1

INVENTOR.
OTTO C. WINZEN
BY
ATTORNEYS

Sept. 27, 1960 O. C. WINZEN 2,954,187
BALLOON AND METHOD AND APPARATUS FOR LAUNCHING THE SAME
Filed Jan. 13, 1955 6 Sheets-Sheet 2

INVENTOR.
OTTO C. WINZEN
BY
ATTORNEYS

Sept. 27, 1960   O. C. WINZEN   2,954,187
BALLOON AND METHOD AND APPARATUS FOR LAUNCHING THE SAME
Filed Jan. 13, 1955   6 Sheets-Sheet 4

INVENTOR.
OTTO C. WINZEN
BY
ATTORNEYS

Sept. 27, 1960          O. C. WINZEN          2,954,187
BALLOON AND METHOD AND APPARATUS FOR LAUNCHING THE SAME
Filed Jan. 13, 1955                                                6 Sheets-Sheet 5

INVENTOR.
OTTO C. WINZEN
BY
ATTORNEYS

Sept. 27, 1960     O. C. WINZEN     2,954,187
BALLOON AND METHOD AND APPARATUS FOR LAUNCHING THE SAME
Filed Jan. 13, 1955     6 Sheets-Sheet 6

INVENTOR.
OTTO C. WINZEN
ATTORNEYS

United States Patent Office 2,954,187
Patented Sept. 27, 1960

2,954,187

BALLOON AND METHOD AND APPARATUS FOR LAUNCHING THE SAME

Otto C. Winzen, Mendota Township, Dakota County, Minn., assignor to Winzen Research, Inc., Fleming Field, Dakota County, Minn., a corporation of Minnesota Filed Jan. 13, 1955, Ser. No. 481,570

10 Claims. (Cl. 244—31)

This invention relates to new and useful improvements in balloons; specifically to new and useful improvements in balloons adapted to be inflated at the apex thereof and to a unique method and apparatus for flying the same.

While great strides have been made in recent years in new and useful balloon structures and in method and apparatus for flying these new and useful balloons, there has remained the problem, unsolved, of providing a balloon, particularly a large balloon and a method and apparatus for rapid and efficient launching of the same, particularly in other than relatively calm conditions.

In this invention, with the utilization of a balloon having a novel apex construction, novel structure for controlling the inflation of the balloon and a novel method of launching the balloon, this problem has been solved.

It is therefore an object of this invention to provide a new and useful apex-inflated balloon structure.

It is a further object of this invention to provide a new and useful method for inflating and launching a balloon.

It is a still further object of this invention to provide a new and useful apparatus for flying a balloon.

A further object of this invention resides in the new and useful structure of the balloon envelope restriction members, in the structure for securing the same to the balloon, and in the structure for releasing the same.

Still further objects of the invention reside in the method of inflating the balloon; in the method of controlling the location of the inflated portion of the balloon and the subsequent inflation of the entire balloon, and in the method of releasing or launching the balloon for airborne flight.

Still further objects of the invention reside in the novel equipment and method utilized herein for the safe launching of large, new and non-rigid balloons designed to carry heavy loads to high altitude, and in heavier than normal surface winds.

Other and further objects of this invention are inherent in the invention as described, illustrated and claimed and will become apparent as the discription proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings, in which correponding numerals refer to the same parts and in which.

*Balloon, apex inflation means and load supporting means*

Figures 1, 2:
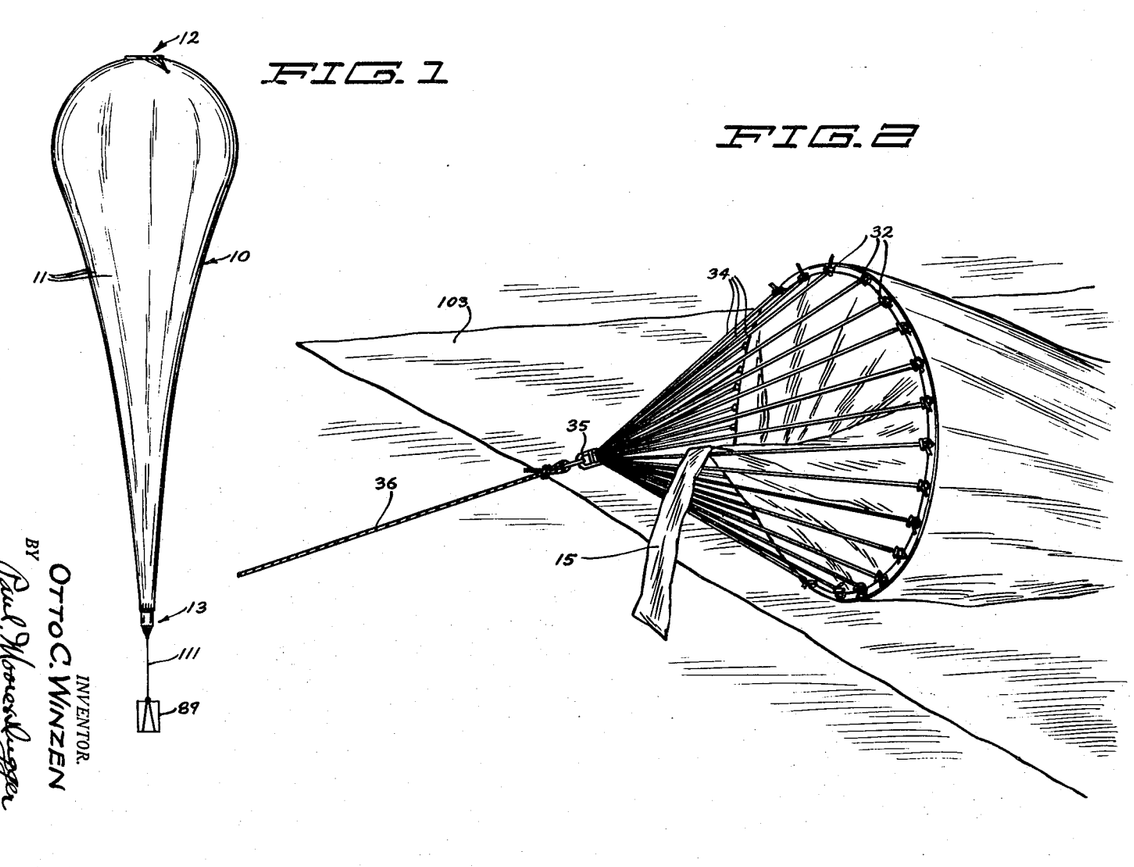
Figure 1 is an elevational view of the balloon of this invention.
Figure 2 is a fragmentary perspective view of the balloon of Figure 1, showing the apex inflation structure prior to inflation.

By reference now to Figure 1, there is shown the balloon generally designated 10, in flight. This balloon is usually constructed of a plurality of gores 11 of synthetic resinous material, and is provided with an apex inflation means, generally designated 12, and a load harness, generally designated 13.

The apex inflation means is shown best in Figures 2–6, and comprises an inflation duct, 15, usually of synthetic resinous material such as polyethylene, having a tubular section 16 and a conical section 18 joined integrally thereto. The tubular section 16, when not in use, is usually collapsed naturally into flat wall-to-wall relationship.

Figures 5, 6:
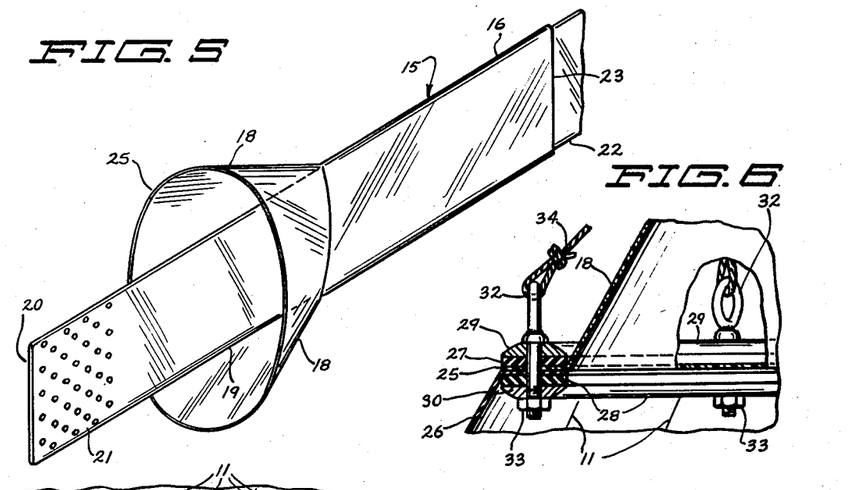
Figure 5 is an isometric view of the inflation duct of this invention.
Figure 6 is a fragmentary sectional view of the stiffener rings and gasket for securing the inflation duct to the balloon.

Positioned on the inside of the inflation duct 15 is an inflation tube 19 having a heat sealed end 20 and a baffle portion 21 in which there is provided a plurality of apertures.

Thus, as shown in Figure 5, the inflation tube is positioned within the tubular section 16, extends through and beyond the conical section 18 and is joined to section 16 in any convenient manner such as lamination, heat-sealing, etc. As shown in Figure 5, the open end 22 of the inflation tube 19 extends beyond the end 23 of duct 15 and both are usually in lay-flat relation when not in use for inflating the balloon.

The base end 25 of the conical section 18 is secured to the balloon envelope at the apex of the balloon 10 as shown best in Figures 1–4. It is preferably heat-sealed thereto but may be otherwise joined as desired.

Thus, by reference to Figure 6, there will be seen the end 25 of conical section 18 joined to end 26 of gores 11 and integrally secured thereto by heat-sealing. Such juncture takes the nature of a circle and a plurality of apertures is positioned in spaced relation around such circle juncture. Positioned upon the exterior of the end 25 of conical section 18 overlying the juncture is a circular gasket 27 having apertures corresponding with those in the juncture. An identical gasket 28 is positioned on the side of the ends 26 of gores 11, which is interior with reference to the balloon envelope.

Superimposed upon each of the gaskets 27 and 28 are the respective stiffener rings 29 and 30 which likewise are provided with spaced apertures cooperating with the apertures in the gaskets and the juncture.

Positioned in each set of cooperating apertures in rings 29 and 30, gaskets 27 and 28 and ends 25 and 26 is an eye bolt 32, upon the threaded shank of which is secured a nut 33 which draws the stiffener rings 29 and 30 together to form the unitary assembly shown in Figure 6.

Figures 3, 4:
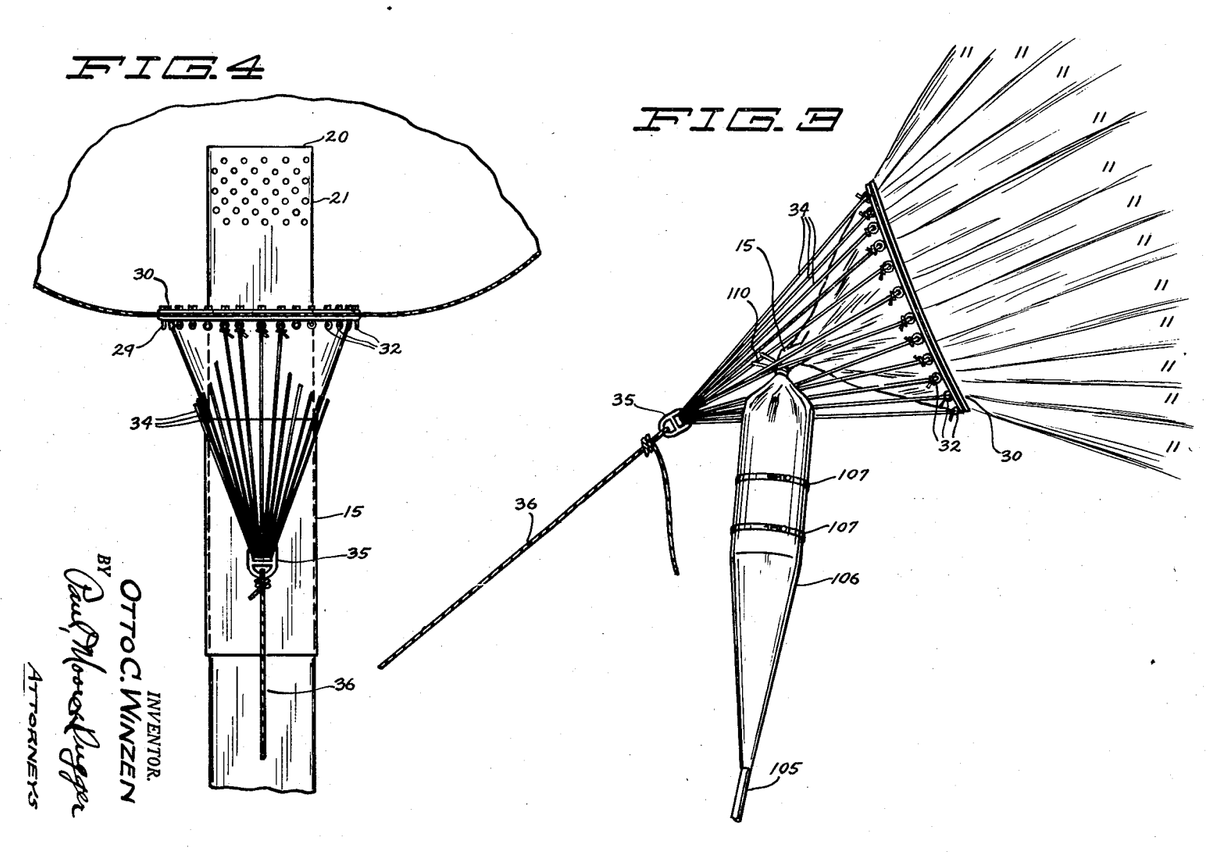
Figure 3 is a view similar to Figure 2 but showing the apex inflation structure during inflation.
Figure 4 is an elevational view, partially in section, and showing the apex inflation structure.

Secured to each of the eye bolts 32 is a cord 34, usually of nylon, one end of which is tied or otherwise secured to one of the eye bolts 32 and passed through a D-ring 35 and secured at the other end to an oppositely positioned eye bolt 32. Thus the stiffener rings 29 and 30, eye bolts 32, cords 34 and D-ring 35, serve to form an apex harness, and to the D-ring 35, which provides an apex tie down point, is secured a tie down line 36 usually of nylon, as shown in Figures 2 and 3. The cords 34 form a conical cage, as shown in Figure 4, through which the inflation duct 15 is extended by separating two adjacent cords as shown in Figure 3, when the balloon is inflated, but within which the inflation duct is positioned (shown in Figure 1) when the balloon is fully inflated and in flight. For the sake of illustration, the duct 15 in Figure 4 is illustrated in lay-flat condition, thus necessitating two adjacent cords to be extremely widely spread. However, in normal use the inflation duct will emerge from the cage formed by the cords 34 in the fashion shown in Figure 3.

Figures 7, 8:
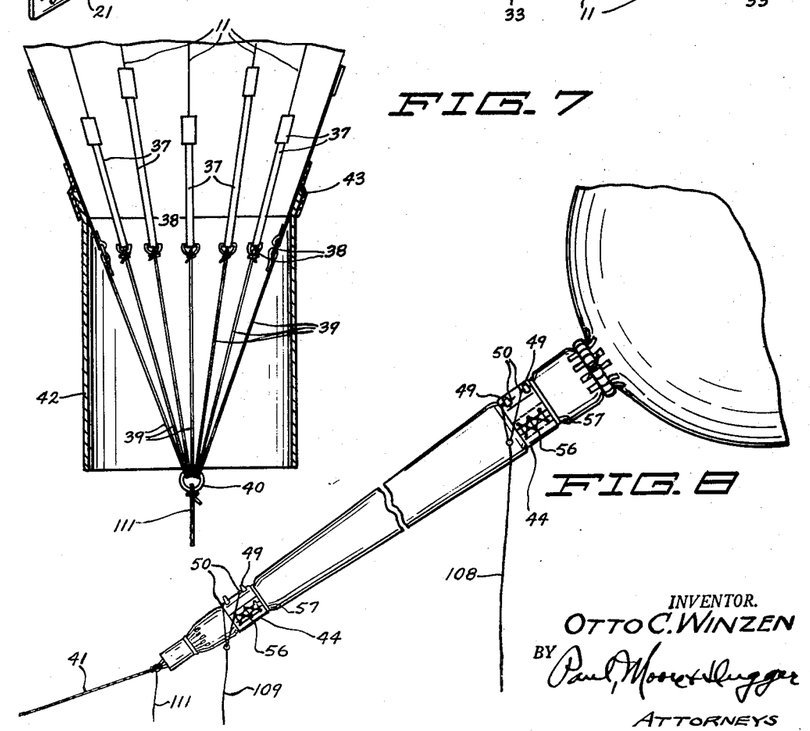
Figure 7 is a fragmentary elevational view of the appendix of the instant balloon and showing the load harness for supporting the load to be carried by the balloon.
Figure 8 is an elevational view of the balloon, partially inflated and showing the restraining means for confining the gas as the balloon is inflated.

The load harness 13 comprises, as shown in Figure 7, a plurality of load bearing tapes 37 which are usually positioned over and secured to the juncture of adjacent gores 11 as shown, and which may extend part way up the balloon or entirely up to the apex thereof. Various type load harnesses and load supporting tapes may be utilized without departing from the spirit and scope of this invention and the described harness is merely exemplary. The tapes 37 may be pressure sensitive tapes and adhesively secured to the balloon envelope. Positioned at each extending end of one of the tapes 37 and secured thereto is a D-ring 38. To oppositely positioned D-rings are tethered a plurality of nylon cords or lines 39, each cord passing through a load ring 40. To the load ring 40 is secured an appendix tie-down line 41 as more fully explained hereinafter.

A flexible skirt 42 may be secured to the bottoms of gores 11 by adhesive tapes 43 or other means and serves to close the bottom of the balloon and to cover the appendix tie-down harness. However, it is to be understood that an appendix harness of the type shown in Winzen, Patent No. 2,526,719, or other conventional appendix harness may be used, as desired, all within the spirit and scope of this invention.

*Envelope restraining means*

Figure 9:
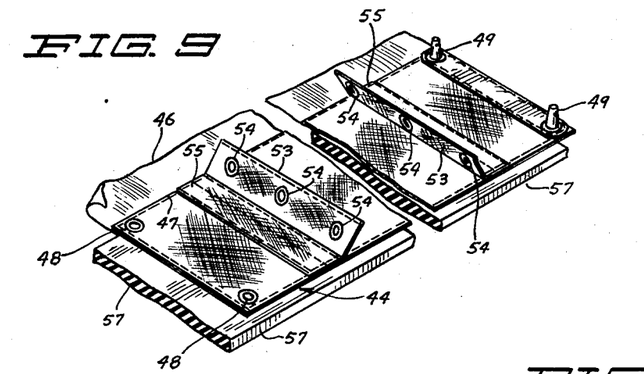
Figure 9 is an isometric view of one of the restraining means or "corsets" of the instant invention.
Figure 10:
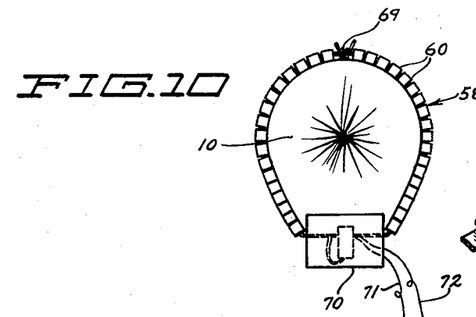
Figure 10 is a diagrammatic view of another of the restraining means or "choker" of the instant invention; and showing release means therefor.
Figure 11:
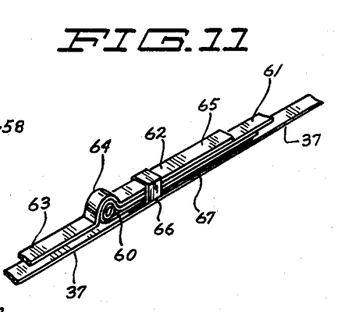
Figure 11 is an isometric view of the means for securing the restraining means of Figure 10 to the balloon.

The envelope restraining means for confining gas to a portion of the balloon during inflation to provide a "bubble" comprises two of the restrainers or "corsets," shown in Figure 9, and one of the restrainers or "chokers" illustrated in Figures 10 and 11.

The "corsets" 44 shown in Figure 9, comprise a relatively stiff material such as canvas, in the shape of an elongated band. For example, the band may consist of a double thickness of heavy-duty canvas and reinforced with cotton cord welts at stress points. To this band is provided a liner 46 of more flexible material secured thereto. The liner 46 provides an inner ply for the corset 44 and also extends a width of several inches beyond one of the side edges, in this instance, edge 47 of corset 44, to protect the balloon from the edge. At one end of each corset 44 is provided a pair of grommets 48 and at the other end a pair of cones 49 adapted to penetrate through the grommets 48, whereupon the end of the corset 44 provided with grommets 48 may be positioned securely with reference to the end of corset 44 provided with cones 49 and retained thereon by securing pins 50 secured to a rip line 51, as shown in Figure 8.

Adjacent each end of the corset is provided a flap 53 provided with grommets 54 and secured to the corset at 55. When the corset is in position upon the balloon as shown in Figure 8, a flexible cord 56 is laced through the grommets 54 to tighten the corset therearound.

Each corset is used with a protective pad 57 usually of foam rubber and of an extension such as to underlie the corset to protect the material of the balloon therefrom.

The envelope restraining means, shown in Figures 10 and 11, comprises a "choker" or bubble control unit, generally designated 58. As shown in Figure 11, the choker 58 comprises a series of cylindrical sections 60 positioned preferably over the load tapes 37 of the balloon or they may be positioned between the load tapes or gore junctures, if desired. A series of sections 60 is positioned at a constant level around the balloon with reference to the longitudinal axis thereof. Each section 60 is provided with a first supporting tape 61 passed around cylindrical section 60 and doubled back upon itself as shown in Figure 11. A reinforcing tape 62 is then positioned to have one end 63 situated on load tape 37, a middle portion 64 overlying the cylindrical section 60 and other end portion 65 overlying tape 61, and extending slightly therebeyond on tape 37. A short segment of tape 66 is usually wrapped around the assemblage formed by end 65, tape 61 and a double coated tape 67, all as shown in Figure 11.

Thus, as shown in Figure 11, the tape 61 provides two plies of tape with adhesive surfaces positioned together, and at the fold of which is positioned a cylindrical section 60. Tape 62 provides a ply having the ends 63 adhesively positioned to tape 37, middle 64 adhesively positioned to the fold of tape 61 overlying the cylindrical section 60 and end 65 of tape 62 is adhesively secured to tape 61, and tape 37. The tape section 66 then serves to join the assemblage to double backed tape 67, each back of which is provided with adhesive, which tape serves to secure the assemblage to the load tape 37.

While one embodiment has been shown including a plurality of cylindrical sections and specific structure for securing the cylindrical sections to the balloon envelope, it is to be understood that other structure for securing the cylindrical sections to the balloon envelope may be utilized within the contemplation of this invention and other means (such as flexible tubular sections secured to the balloon envelope) may be substituted for the cylindrical sections, all within the terms of this invention.

A line 69 is passed through the cylindrical sections 60 and is joined at its end by a squib cannon 70 or other severing means and serves to choke or gather the balloon envelope and restrain it in a folded or collapsed position as is shown in Figure 10. Thus, the line 69 equipped with the squib cannon 70 is threaded through the cores 60, drawing them tightly together to form a circular choker of a predetermined diameter.

*Choker release*

Release means for severing of the line 69 after the launching of the balloon is provided in the form of a squib cannon 70 which is normally fired by radio control from the ground, but which may alternatively be fired by a barometric control unit.

Figure 19:
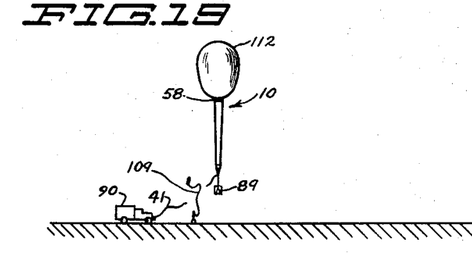
Figure 20:
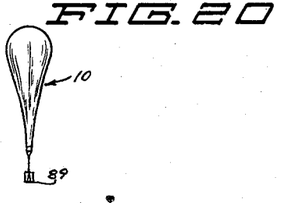

Thus, in Figure 10, the squib cannon 70 is provided with a pair of lead wires 71 and 72. Upon energization, the squib cannon serves to sever the line 69 whereupon internal pressure in the balloon 10 will cause the line to be withdrawn from the cylindrical section 60 and will spread the balloon envelope as shown in Figures 19 and 20.

Figure 12:
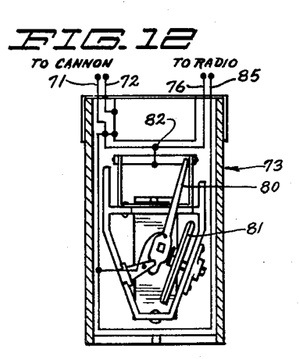
Figure 12 is an elevational view, partially in section, showing one of the actuators for the release means for disengaging the restraining means of Figure 10 from the balloon.
Figure 13:
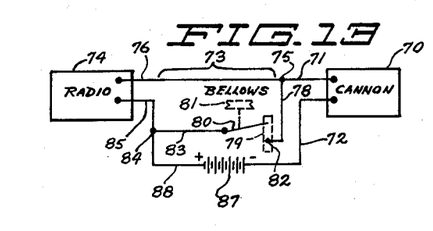
Figure 13 is a wiring diagram showing the connections to the actuators for the release means.

Lead wires 71 and 72 are connected to a barometric control 73 (Figure 12) which is also connected to a radio 74 as shown in Figure 13. Thus, as illustrated in those figures, the cannon 70 is provided with lead wire 71 which is connected to juncture 75 and by line 76 to radio 74. Juncture 75 is also connected to line 78 which leads to a commutator bar 79 over which a contact arm 80 is adapted to be moved by the expansion and contraction of bellows 81. Contact arm 80 is in turn connected via line 83, juncture 84 and line 88 to one terminal of battery 87. Line 72 from cannon 70 is connected to the other terminal of battery 87; juncture 84 is also connected via line 85 to radio 74.

Thus, it will be seen by reference to Figures 12 and 13, that the cannon will be detonated upon the establishment of the circuit through line 72, battery 87, line 88, juncture 84, line 83, contact arm 80, contact 82, line 78, juncture 75 and line 71, whenever the bellows 81 have caused contact arm 80 to engage contact 82. Likewise, whenever the radio 74 is actuated to provide a circuit through line 72, battery 87, line 88, juncture 84, line 85, line 76, juncture 75 and line 71, the cannon 70 will likewise be detonated. The radio 74 is a conventional receiver actuated by control from the ground.

The barometric control unit 73, and the radio 74 are conventionally positioned in the load 89 carried by the balloon as shown in Figure 1, and the control wires 71 and 72 extend from the load to the squib cannon.

*Vehicular equipment*

Figure 14:
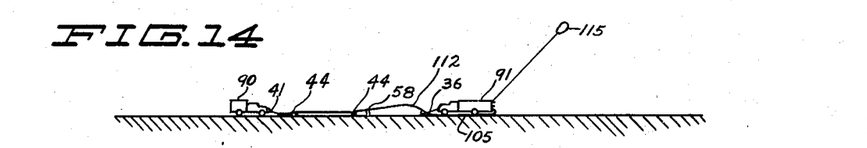
Figures 14–20 are diagrammatic views illustrating sequence steps in the inflation and launching of the balloon of Figure 1.
Figure 16:
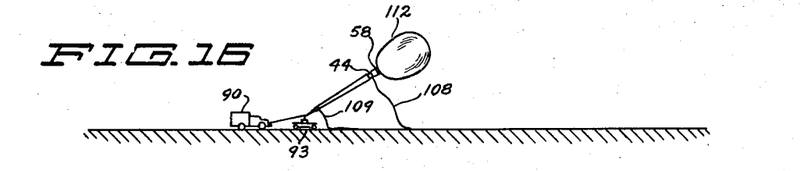
Figure 21:
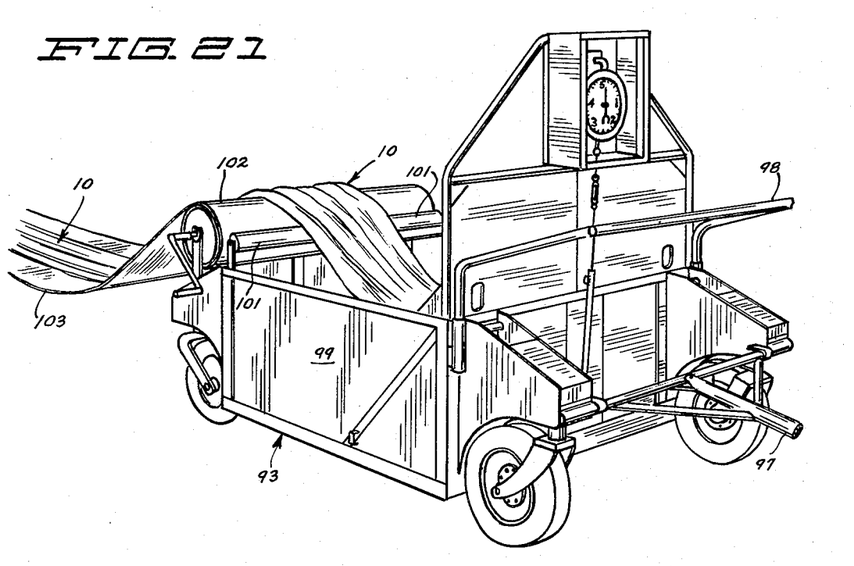
Figure 21 is a perspective view of the launching cart of this invention.
Figure 22:
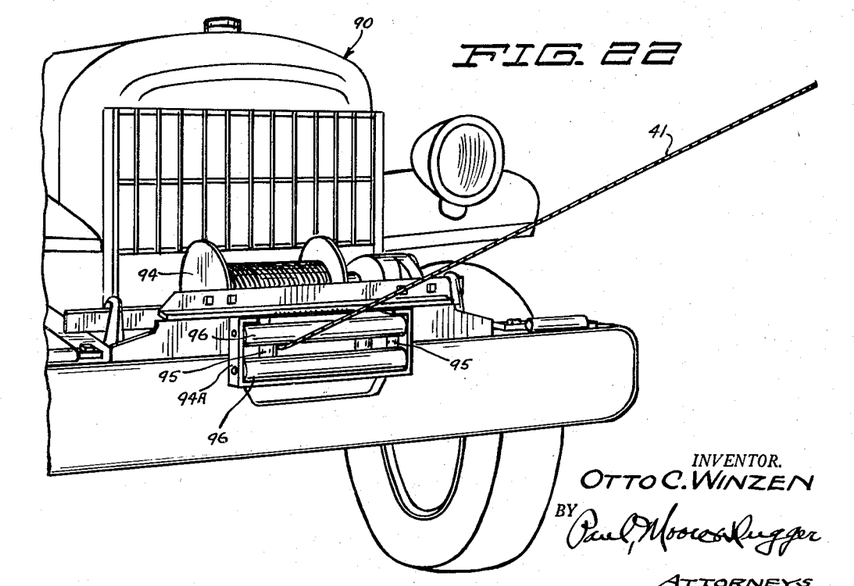
Figure 22 is a fragmentary perspective view of the launching truck of this invention.

The vehicular equipment utilized in launching the balloon of this invention comprises a first truck 90 shown in Figures 14 and 22, a second truck 91, shown in Figure 22, and a launching cart 93 shown in Figures 16 and 21.

The truck 90 is a commercially procurable cargo truck but is provided with a winch 94 at one end thereof around which is wound the line 41. Line 41 is guided onto and off the winch by a fairlead 94A secured to the frame of the vehicle and provided with vertical guide rollers 95 and horizontal guide rollers 96. While as shown the winch 94 is positioned on the front of the truck or vehicle 90, it of course may be positioned on the rear thereof if desired.

The truck 91 may be substantially identical with truck 90 if desired. As shown in Figure 14, it serves as a supply truck for carrying a quantity of gas supplied to the balloon and also as an appendix hold-down means, the appendix tie down line 36 being secured to any convenient portion thereof, such as the bumper, etc.

The launching cart 93, shown best in Figures 16 and 21, is usually a four-wheeled vehicle adapted to be towed by tow bar 97 or to be moved by handle 98. The cart is provided with a hollow body 99 in which the balloon 10 is positioned when in collapsed or folded position and from which the balloon is adapted to be withdrawn as shown in Figure 21. A guide roller 101 serves to prevent drag of the balloon material as it is drawn from body 99.

Positioned rearwardly of the guide roller and journalled for rotation is a ground cloth reel 102 from which ground cloth 103 is adapted to be unwound. Thus, the ground cloth 103 and the balloon 10 may be simultaneously extracted from the cart 93. This may be accomplished by maintaining the cart in fixed position and withdrawing the ground cloth and the balloon or maintaining a withdrawn end of the ground cloth and balloon in fixed position and traversing the cart by suitable means from left to right with reference to Figure 21.

The ground cart also serves to support and position the load when it is attached to the balloon as will be later explained. The launching cart serves as a trailer for transportation of the balloon, serves as a cart for laying out of the ground cloth of the balloon and functions as a load cart during launching.

*Operation and launching*

Figure 15:
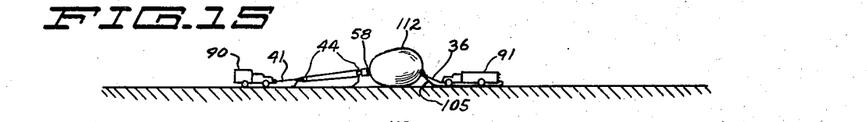

The truck 90 serves as a cart or truck to transport the crew and equipment to the launching site, serves as a base of operation and serves as a launching truck to control the actual launching of the balloon. The truck 91 serves as a gas supply truck, and in addition serves as a tie-down means for tying down the apex of the balloon during launching. The bottom corset 44 serves to close the bottom of the balloon to prevent "bellying" due to wind during inflation and the top corset serves to confine gas to the bubble proper (112 in Figure 15) during inflation. The foam rubber pads 57 serve to protect the balloon material when the corsets are in place and the liner 46 serves to preclude any sharp edges on the corset 44 from damaging the material of the balloon during inflation. As will be appreciated with reference to Figure 15, the liner is usually positioned so that its extending edge lies in the direction of the bubble 112. The ground cloth 103 serves as an overall protective sheet between the balloon and the ground and a portion of increased area may be provided beneath the bubble 112 as desired.

The apex harness provides an apex tie down point and absorbs the major stresses encountered during balloon inflation. The inflation duct enables rapid gas tank connections and simple positive tying off of the duct when the inflation is completed. The inflation tube with its multiple hole baffle diffuses the incoming gas evenly, enabling extremely rapid inflation. The launching of the balloon is probably best illustrated with reference to Figures 14–20. Thus, with reference to Figure 14, the launching cart 93 is moved to the launching site, one end of the balloon 10 and the ground cloth 103 is positioned upon the ground and the cart 93 then towed away so that the entire length of the balloon will be laid out upon the ground, upon the cloth 103, cloth 103 freely unwinding from reel 102 and balloon 10 freely passing over roller 101 as the cart is towed away. If desired, the cloth 103 may be enlarged or an additional cloth provided under the portion of the balloon which will comprise bubble 102. The cart is then removed temporarily. Truck 90 is then moved in the position shown in Figure 14 and line 41 attached to ring 40. Truck 91 containing the gas is moved to the position shown in Figure 14 and line 36 connected to D-ring 35 and to a suitable point on the truck as shown in Figures 2 and 14. The inflation duct 15 is then brought through two of the cords 34 as shown in Figure 2 and the inflation hose 105, leading from the source of gas supply, usually helium, connected to the duct 15, as shown in Figure 3. The inflation hose 105 is provided with a conical baffle 106 at the end thereof and the inflation duct is secured to the exterior thereof by two clamps 107.

One of the foam rubber pads 57 and the top corset 44 are positioned as shown at Figure 14, at approximately the center of the balloon and the bottom corset 44 is positioned as shown at Figure 14, adjacent the bottom of the balloon, together with its foam rubber pad 57. Cones 49 for each of the corsets 44 are positioned through grommets 48 and the retaining pins are then inserted. The retaining pins for top corset 44 are secured to a rip or release line 108 and the retaining pins for bottom corset 44 are secured to a rip or release line 109. The top corset and its respective pad are positioned around the balloon approximately 3 feet below the bubble control unit or "choker" 58 which is secured in position around the balloon, as shown in Figure 10, before the balloon is positioned in the position of Figure 14. The flexible cords 56, one for each of corsets 44, are then laced through their respective grommets 54 of flaps 53 to draw the flaps together and thus secure the corsets tightly in place. The balloon is then inflated through line 105.

When inflation of the balloon is completed and before the hose 105 is removed, the duct 15 is twisted to the position shown in Figure 3 and tied securely with a line 110. The inflation tube is then severed between the tie 110 and baffle 106, and the tied section is pushed into the cage formed by the cords 34. The space within the cage may then be filled with scraps of resilient material to prevent damage to the tie, if desired.

Figure 17:
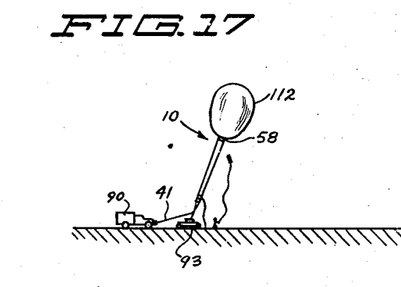
Figure 18:
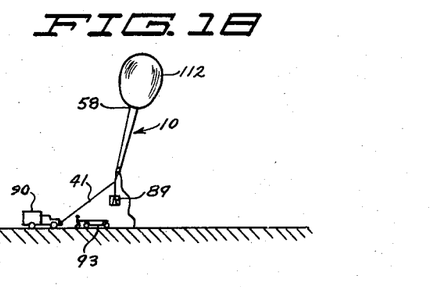

Tie down line 36 is then cut as close as possible to the ring 35, allowing the balloon to erect as shown in Figures 16, 17 and 18. Before the apex tie down line 36 has been severed, the launching cart is moved in the position shown in Figure 16, and the load 89 secured to the load ring 40 by line 111. The load includes the barometric control unit 73, the battery 87 and the radio 74.

The squib cannon 70 is provided with lead 71 and 72 which may have previously been connected to the unit 73 or which may be so connected at this time. The appendix line 41, is then played out from the winch 94, allowing the balloon to rise gradually from the position of Figure 15 to that of Figure 17. The launching cart 93 will usually automatically position itself beneath the balloon as the bubble 102 elevates through this sequence and if not, the launching cart is positioned to maintain the load directly beneath the balloon load ring. The top corset 44 is meanwhile released by pulling upon rip-cord 108.

When the balloon has reached the position of Figure 17, the load 89 is then released from the cart to which it has been heretofore fixedly positioned, and the launching cart 93 is removed to a safe distance.

When the load 89 is safely airborne and the balloon is in the position of Figure 18, the bottom corset is released by pulling the rip line or release line 109, as shown in Figure 19.

The line 41 is then cut as close to the balloon 10 as possible.

After the balloon reaches a safe altitude, the ground transmitter is actuated, transmitting signals to the radio receiver 74, which closes the circuit to squib cannon 70 which severs line 69, and the internal pressure of the balloon causes the balloon envelope to assume the shape of Figure 20 from that of Figure 19.

If for some reason the radio control should not operate, the barometric control switch 73, by expansion of the bellows 81, at a pre-set altitude, will likewise close the circuit to the squib cannon 70, and cause the balloon to assume the position of Figures 1 and 20.

It is preferred to orient the launching of this balloon with reference to the wind. For this reason, a pilot balloon 115, shown in Figure 14, is inflated to determine the wind direction. The truck 91 is then positioned downwind from the planned position of truck 90 and points directly into the wind. Thus, the balloon will be launched down-wind. The launching cart, as it unreels the ground cloth 102 and the balloon 10 is towed directly up into the wind.

It will thus be seen that the balloon of this invention incorporated a bubble control unit, comprising the choker 58 and the corsets 44, to confine the gas to the bubble proper during inflation and the early stage of ascension, and a novel apparatus and method is provided for launching the balloon even in relative heavy winds.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. In a balloon, the improvement comprising an apex inflation means attached to the apex of a balloon including a harness to which securing means may be connected, an inflation member having an end secured to the apex of the balloon within said harness, said harness providing a cage, and said inflation member being extensible or retractable with reference to said cage.

2. In a balloon, the improvement comprising an apex inflation means including a load harness having a plurality of flexible cord means arranged so as to form a substantially conical shape, a securing means connected to said harness at the apex of said cone and said flexible cord means connected to said balloon at the base of said cone, an inflation tube secured to the envelope of said balloon interior of said cone.

3. A balloon envelope having an apex and an oppositely disposed appendix, a tubular inflation member joined at one end to said envelope at said apex for the introduction of gas therein, harness means secured to said envelope at said apex and means joining said harness means to said apex and said tubular member.

4. In a balloon envelope, the improvement comprising an apex inflation duct, said apex inflation duct comprising a tubular member, a conical member joined integrally thereto, said conical member being joined to the apex of a balloon, ring means joining said conical member to said balloon apex, and a harness means attached to said ring means.

5. The method of launching a balloon which comprises securing one end thereof, extending the balloon to full linear extension, securing the other end thereof, applying prolongatory and oppositely directed forces to the ends of the balloon to maintain the same in substantially linear extension during inflation, confining the balloon circumferentially to provide a first confinement adjacent the apex end to form a portion of balloon envelope which may be inflated to form a bubble at said apex end, confining the balloon circumferentially at a position adjacent the first confinement thereof to form a second confinement but spaced between the first confinement and the appendix end, confining said balloon circumferentially adjacent said appendix end, said confinements being sufficiently tight substantially to preclude transfer of gas between said bubble and the remainder of said envelope, inflating said balloon at and from said apex end, until said bubble has reached predetermined volume, releasing said apex end so that said bubble may pivot said balloon from the horizontal to the vertical about said appendix end as a pivot, releasing said second confinement, releasing said confinement adjacent said appendix end, and then releasing said first confinement only after said balloon is airborne by radio control.

6. The method of launching a balloon which comprises extending the balloon to full linear extension, immobilizing the ends thereof to maintain the same in substantially linear extension during inflation, confining the balloon circumferentially to provide a first confinement adjacent the apex end to form a portion of balloon envelope which may be inflated to form a bubble at said apex end, and substantially to preclude transfer of gas between said bubble and the remainder of said envelope, inflating said balloon at and from said apex end until said bubble has reached predetermined volume, and releasing said apex end so that said bubble may pivot said balloon from the horizontal to the vertical about the point of immobilization of the appendix end as a pivot, and releasing said confinement.

7. In a balloon the improvement comprising a releasable stricture means positioned around a portion of the balloon for initially confining the volume of lifting gas inserted in the balloon, said stricture means operable substantially to preclude transfer of gas between said confined volume and the remainder of said balloon, said stricture means including a severable portion, and radio actuated means for severing said portion.

8. In a balloon the improvement comprising a releasable stricture means positioned around a portion of the balloon for initially confining the volume of lifting gas inserted in the balloon, said stricture means operable substantially to preclude transfer of gas between said confined volume and the remainder of said balloon, said stricture means including a flexible line, said balloon envelope including a plurality of apertured members through which said line is adapted to pass, and said line being passed through the apertures in said members to form a circumferential choker.

9. In a balloon, the improvement of a plurality of manually releasable strictures positioned in spaced relation to encircle the balloon, said strictures being positioned to provide a bubble at one end of the balloon and a confined portion between said bubble and the appendix end of the balloon, and said strictures being individually releasable.

10. The structure of claim 9 in which all but one of said strictures are manually releasable and said one of said strictures is provided with means operable after the balloon is in free flight to release the same.

References Cited in the file of this patent

UNITED STATES PATENTS

| | | |
|---|---|---|
| 151,124 | Hartness | May 19, 1874 |
| 1,372,260 | Wilkin | Mar. 22, 1921 |
| 1,475,304 | Kraft | Nov. 27, 1923 |
| 2,602,609 | Huch | July 8, 1952 |
| 2,635,834 | Huch | Apr. 21, 1953 |
| 2,635,835 | Dungan | Apr. 21, 1953 |
| 2,783,002 | Ney et al. | Feb. 26, 1957 |
| 2,900,147 | Huch et al. | Aug. 18, 1959 |

FOREIGN PATENTS

| | | |
|---|---|---|
| 122,961 | Germany | Aug. 14, 1901 |
| 290,716 | Great Britain | May 16, 1928 |